United States Patent
Ivanov et al.

(10) Patent No.: US 12,114,238 B2
(45) Date of Patent: Oct. 8, 2024

(54) INDOOR LOCALIZATION BASED ON DETECTION OF BUILDING-PERIMETER FEATURES

(71) Applicant: HERE Global B.V., Eindhoven (NL)

(72) Inventors: Pavel Ivanov, Tampere (FI); Henri Jaakko Julius Nurminen, Tampere (FI); Marko Luomi, Lempaeaelae (FI); Lauri Aarne Johannes Wirola, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 527 days.

(21) Appl. No.: 17/456,691

(22) Filed: Nov. 29, 2021

(65) Prior Publication Data
US 2023/0171570 A1 Jun. 1, 2023

(51) Int. Cl.
*H04W 4/33* (2018.01)
*H04W 4/029* (2018.01)

(52) U.S. Cl.
CPC ............ *H04W 4/33* (2018.02); *H04W 4/029* (2018.02)

(58) Field of Classification Search
CPC ............ H04W 4/33; H04W 4/029; G01S 5/16
See application file for complete search history.

(56) References Cited

U.S. PATENT DOCUMENTS

| 7,516,039 | B2 | 4/2009 | McKitterick |
| 8,502,835 | B1 * | 8/2013 | Meehan ............... G06F 16/58 345/633 |
| 8,660,581 | B2 | 2/2014 | Davis et al. |
| 9,147,284 | B2 * | 9/2015 | Keene ................ G06T 19/20 |
| 9,176,230 | B2 | 11/2015 | Vartanian et al. |
| 9,400,930 | B2 | 7/2016 | Moeglein et al. |
| 10,742,518 | B2 * | 8/2020 | Chen ................. G06T 15/08 |

(Continued)

FOREIGN PATENT DOCUMENTS

WO   WO 2014/172792 A1   10/2014

OTHER PUBLICATIONS

Shabayek et al., "Vision Based UAV Attitude Estimation Progress and Insights", Journal of Intelligent & Robotic Systems, (Jan. 2012), 20 pages.

*Primary Examiner* — Kenny Nguyen
(74) *Attorney, Agent, or Firm* — Jason Wejnert; HERE GLOBAL B.V.

(57) ABSTRACT

A geometric plane defined by a building-perimeter feature in an image capture by a mobile device is identified. The building-perimeter feature is co-located with an exterior wall of a building within which the mobile device is located. An orientation and/or location of the mobile device with respect to the geometric plane and an orientation of the mobile device with respect to a defined geographical direction are determined. A building model for the building and defining perimeter portions of the building (each perimeter portion corresponding to a respective exterior wall) is obtained or accessed. Based on the orientation and/or location of the mobile device with respect to the geometric plane, the orientation of the mobile device with respect to the defined geographical direction, and/or the building model, a particular perimeter portion of the building model that corresponds to the building-perimeter feature is identified and corresponding location information is determined.

20 Claims, 6 Drawing Sheets

(56) References Cited

U.S. PATENT DOCUMENTS

| | | | |
|---|---|---|---|
| 11,057,612 B1* | 7/2021 | Clemens | H04N 13/275 |
| 11,508,131 B1* | 11/2022 | Clemens | H04N 13/279 |
| 11,574,439 B2* | 2/2023 | Sun | G06V 20/653 |
| 2011/0064312 A1* | 3/2011 | Janky | G06T 7/74 |
| | | | 382/195 |
| 2011/0102376 A1* | 5/2011 | Kang | G06F 3/0325 |
| | | | 345/175 |
| 2012/0087212 A1* | 4/2012 | Vartanian | G01S 5/012 |
| | | | 367/118 |
| 2013/0182891 A1* | 7/2013 | Ling | G06F 16/5866 |
| | | | 382/103 |
| 2013/0201365 A1* | 8/2013 | Wirola | H04W 64/00 |
| | | | 348/231.3 |
| 2013/0202157 A1* | 8/2013 | Pershing | G06F 30/13 |
| | | | 702/156 |
| 2013/0222369 A1* | 8/2013 | Huston | G06F 16/954 |
| | | | 345/419 |
| 2015/0094952 A1* | 4/2015 | Moeglein | G01S 19/14 |
| | | | 701/532 |
| 2015/0260541 A1* | 9/2015 | Smith | G01C 21/206 |
| | | | 701/439 |
| 2019/0028358 A1* | 1/2019 | Chen | H04B 17/327 |
| 2022/0284675 A1* | 9/2022 | Sun | G06T 15/04 |
| 2023/0171570 A1* | 6/2023 | Ivanov | H04W 4/33 |
| | | | 455/414.1 |
| 2023/0267728 A1* | 8/2023 | Steffanson | H04N 5/33 |
| | | | 382/103 |
| 2023/0393282 A1* | 12/2023 | Kuismanen | G01S 19/072 |

* cited by examiner

INDOOR LOCALIZATION BASED ON DETECTION OF BUILDING-PERIMETER FEATURES

TECHNOLOGICAL FIELD

An example embodiment relates to performing indoor localization and/or collecting information that may be used to generate a digital map usable for performing indoor localization. An example embodiment relates to performing indoor localization based on at least detection of a building-perimeter feature in captured sensor data and information regarding the perimeter of a building. An example embodiment relates to generating a radio map based at least in part on information determined based at least on the detection of a building-perimeter feature in captured sensor data and information regarding the perimeter of the building.

BACKGROUND

In various scenarios, global navigation satellite system (GNSS)-based positioning is not available and/or not accurate (e.g., indoors, in urban canyons, and/or the like). In such scenarios, radio-based positioning may be used. For example, a computing device may observe one or more network access points (e.g., cellular network access points, Wi-Fi network access points, Bluetooth network access points, and/or other radio frequency-based network access points) and, based on characteristics of the observations and the known location of the observed access points, a position estimate for the computing device may be determined.

However, in a variety of circumstances, the location of the access points must be learned. Areas where radio mapping is most advantageous are often areas where GNSS-based positioning is not available and/or not accurate. Therefore, accurately learning the location of access points within such spaces can be difficult.

BRIEF SUMMARY

Various embodiments provide methods, apparatus, systems, and computer program products for performing indoor localization and/or generating a radio map usable for performing indoor localization based on the detection of building-perimeter features in captured sensor data. For example, the building-perimeter feature may be a window that is represented in a digital image captured by sensors of a mobile device. Information regarding the window that is extracted from the digital image (e.g., determined based on processing and/or analyzing the digital image), other imaging sensor data captured by the mobile device (e.g., magnetic field measurements, acceleration data, and/or the like), information regarding the perimeter and/or boundary of the building that the mobile device is located within, and/or the like is used to determine a location of the mobile device (e.g., substantially at the time the digital image and/or other imaging sensor data was captured). For example, in an example embodiment, information is determined from the digital image regarding a normal direction to a geometric plane defined by the building-perimeter feature. In an example embodiment, an orientation of the mobile device with respect to defined geographic direction at the time the digital image was captured is determined. In an example embodiment, the orientation of the mobile device at the time the digital image was captured and the normal direction to the geometric plane defined within the digital image by the building-parameter feature are used to determine a particular perimeter portion of a model of the building that corresponds to the building-perimeter feature. Location information is then determined based at least on the determined particular perimeter portion, in various embodiments. The location information may then be used as part of estimating a position of the mobile device (at substantially the time when the digital image was captured) and/or for generating and/or updating a radio map of the building.

In an example embodiment, one or more processors (e.g., of a network device or a mobile device) identify, within an image captured by an imaging device of a mobile device, a geometric plane defined by a building-perimeter feature represented by the image, the building-perimeter feature being part of or connected to an exterior wall of a building within which the mobile device is located. The one or more processors determine one or more of an orientation or a location of the mobile device with respect to the identified geometric plane defined by the building-perimeter feature. The one or more processors determine an orientation of the mobile device with respect to a defined geographical direction based at least in part on sensor data captured by one or more sensors of the mobile device. The one or more processors identify the building within which the mobile device is located. The one or more processors obtain or access a building model for the building. The building model defines one or more perimeter portions of the building, each respective perimeter portion of the one or more perimeter portions corresponding to one or more respective exterior walls of the building. The one or more processors identify a particular perimeter portion of the one or more perimeter portions that corresponds to the building-perimeter feature represented by the image based at least in part on (i) one or more of the orientation or the location of the mobile device with respect to the identified geometric plane defined by the building-perimeter feature and (ii) the orientation of the mobile device with respect to the defined geographical direction. The one or more processors determine and/or provide location information that corresponds to or is based on the particular perimeter portion that was identified. The location information represents where the mobile device is or was located substantially when the image was captured.

According to an aspect of the present disclosure, a method for determining and/or providing location information representing where the mobile device is or was located substantially when an image was captured is provided. In an example embodiment, the method comprises identifying, by one or more processors and within an image captured by an imaging device of a mobile device, a geometric plane defined by a building-perimeter feature represented by the image. The building-perimeter feature is part of or connected to an exterior wall of a building within which the mobile device is located. The method further comprises determining, by the one or more processors, one or more of an orientation or a location of the mobile device with respect to the identified geometric plane defined by the building-perimeter feature; determining, by the one or more processors, an orientation of the mobile device with respect to a defined geographical direction based at least in part on sensor data captured by one or more sensors of the mobile device; identifying, by the one or more processors, the building within which the mobile device is located; and obtaining or accessing, by the one or more processors, a building model for the building. The building model defines one or more perimeter portions of the building and each respective perimeter portion of the one or more perimeter portions corresponding to one or more respective exterior walls of the building. The method further comprises identifying, by the one or more processors, a particular perimeter portion of the one or more perimeter portions that corresponds to the building-perimeter feature represented by the image based at least in part on (i) one or more of the orientation or the location of the mobile device with respect to the identified geometric plane defined by the building-perimeter feature and (ii) the orientation of the mobile device with respect to the defined geographical direction. The method further comprises determining and/or providing, by the one or more processors, location information that corresponds to or is based on the particular perimeter portion that was identified. The location information represents where the mobile device is or was located substantially when the image was captured.

In an example embodiment, the building-perimeter feature is a window.

In an example embodiment, the geometric plane defined by the building-perimeter feature is determined based at least in part on at least one of (a) a horizontal edge of the building-perimeter feature within the image or (b) a vertical edge of the building-perimeter feature within the image.

In an example embodiment, the geometric plane defines a feature direction that is normal to the geometric plane and identifying the particular perimeter portion of the one or more perimeter portions that corresponds to the building-perimeter feature comprises comparing the feature direction and a perimeter direction of the particular perimeter portion.

In an example embodiment, the geometric plane is identified in the image by a feature detector operating on the mobile device.

In an example embodiment, the feature detector is a machine-learning trained classifier.

In an example embodiment, the sensor data comprises at least one of (a) magnetic data or (b) acceleration data and the one or more sensors of the mobile device comprise at least one of (a) a magnetic sensor or (b) an accelerometer.

In an example embodiment, the method further comprises, prior to determining the location information, obtaining an indication that a location of the mobile device with respect to the exterior wall feature satisfies one or more proximity criteria, wherein the indication is generated based at least in part on processing of the image.

In an example embodiment, a determination that the location of the mobile device with respect to the exterior wall feature satisfies the one or more proximity criteria is performed by a machine-learning trained artificial neural network trained to detect the building-perimeter feature in the image.

In an example embodiment, the building within which the mobile device is located is determined based at least in part on at least one of (a) an identifier of a wireless signal observed by the mobile device within a particular time period with respect to the capturing of the image, (b) a global navigation satellite system (GNSS) position estimate determined within a particular time period with respect to the capturing of the image, or (c) a final GNSS position estimate determined prior to the mobile device entering the building.

In an example embodiment, the method further comprises obtaining radio observation data captured by the mobile device at substantially a same time as the image was captured; and at least one of (a) providing the radio observation data or (b) using the radio observation data in association with the location information to update a radio map.

In an example embodiment, the method further comprises using the determination that the mobile device was located within the building proximate the particular perimeter portion corresponding to the building-perimeter feature when the image was captured as input to a hybrid positioning algorithm.

In an example embodiment, the method further comprises causing a user interface of the mobile device to display a position estimate of the mobile device based at least in part on the location information and/or the identified particular perimeter portion.

According to another aspect of the present disclosure, an apparatus is provided. In an example embodiment, the apparatus comprises at least one processor and at least one memory storing computer program code and/or instructions. The at least one memory and the computer program code and/or instructions are configured to, with the processor, cause the apparatus to at least identify, within an image captured by an imaging device of a mobile device, a geometric plane defined by a building-perimeter feature represented by the image. The building-perimeter feature is part of or connected to an exterior wall of a building within which the mobile device is located. The at least one memory and the computer program code and/or instructions are further configured to, with the processor, cause the apparatus to at least determine one or more of an orientation or a location of the mobile device with respect to the identified geometric plane defined by the building-perimeter feature; determine an orientation of the mobile device with respect to a defined geographical direction based at least in part on sensor data captured by one or more sensors of the mobile device; identify the building within which the mobile device is located; and obtain or access a building model for the building. The building model defines one or more perimeter portions of the building and each respective perimeter portion of the one or more perimeter portions corresponding to one or more respective exterior walls of the building. The at least one memory and the computer program code and/or instructions are further configured to, with the processor, cause the apparatus to at least identify a particular perimeter portion of the one or more perimeter portions that corresponds to the building-perimeter feature represented by the image based at least in part on (i) one or more of the orientation or the location of the mobile device with respect to the identified geometric plane defined by the building-perimeter feature and (ii) the orientation of the mobile device with respect to the defined geographical direction. The at least one memory and the computer program code and/or instructions are further configured to, with the processor, cause the apparatus to at least determine and/or provide location information that corresponds to or is based on the particular perimeter portion that was identified. The location information represents where the mobile device is or was located substantially when the image was captured.

In an example embodiment, the building-perimeter feature is a window.

In an example embodiment, the geometric plane defined by the building-perimeter feature is determined based at least in part on at least one of (a) a horizontal edge of the building-perimeter feature within the image or (b) a vertical edge of the building-perimeter feature within the image.

In an example embodiment, the geometric plane defines a feature direction that is normal to the geometric plane and identifying the particular perimeter portion of the one or more perimeter portions that corresponds to the building-perimeter feature comprises comparing the feature direction and a perimeter direction of the particular perimeter portion.

In an example embodiment, the geometric plane is identified in the image by a feature detector operating on the mobile device.

In an example embodiment, the feature detector is a machine-learning trained classifier.

In an example embodiment, the sensor data comprises at least one of (a) magnetic data or (b) acceleration data and the one or more sensors of the mobile device comprise at least one of (a) a magnetic sensor or (b) an accelerometer.

In an example embodiment, the at least one memory and the computer program code and/or instructions are further configured to, with the processor, cause the apparatus to at least, prior to determining the location information, obtain an indication that a location of the mobile device with respect to the exterior wall feature satisfies one or more proximity criteria, wherein the indication is generated based at least in part on processing of the image.

In an example embodiment, a determination that the location of the mobile device with respect to the exterior wall feature satisfies the one or more proximity criteria is performed by a machine-learning trained artificial neural network trained to detect the building-perimeter feature in the image.

In an example embodiment, the building within which the mobile device is located is determined based at least in part on at least one of (a) an identifier of a wireless signal observed by the mobile device within a particular time period with respect to the capturing of the image, (b) a global navigation satellite system (GNSS) position estimate determined within a particular time period with respect to the capturing of the image, or (c) a final GNSS position estimate determined prior to the mobile device entering the building.

In an example embodiment, the at least one memory and the computer program code and/or instructions are further configured to, with the processor, cause the apparatus to at least obtain radio observation data captured by the mobile device at substantially a same time as the image was captured; and at least one of (a) provide the radio observation data or (b) use the radio observation data in association with the location information to update a radio map.

In an example embodiment, the at least one memory and the computer program code and/or instructions are further configured to, with the processor, cause the apparatus to at least use the determination that the mobile device was located within the building proximate the particular perimeter portion corresponding to the building-perimeter feature when the image was captured as input to a hybrid positioning algorithm.

In an example embodiment, the at least one memory and the computer program code and/or instructions are further configured to, with the processor, cause the apparatus to at least cause a user interface of the mobile device to display a position estimate of the mobile device based at least in part on the location information and/or the identified particular perimeter portion.

In still another aspect of the present disclosure, a computer program product is provided. In an example embodiment, the computer program product comprises at least one non-transitory computer-readable storage medium having computer-readable program code and/or instructions portions stored therein. The computer-readable program code and/or instructions portions comprise executable portions configured, when executed by a processor of an apparatus, to cause the apparatus to identify, within an image captured by an imaging device of a mobile device, a geometric plane defined by a building-perimeter feature represented by the image. The building-perimeter feature is part of or connected to an exterior wall of a building within which the mobile device is located. The computer-readable program code and/or instructions portions comprise executable portions further configured, when executed by a processor of an apparatus, to cause the apparatus to determine one or more of an orientation or a location of the mobile device with respect to the identified geometric plane defined by the building-perimeter feature; determine an orientation of the mobile device with respect to a defined geographical direction based at least in part on sensor data captured by one or more sensors of the mobile device; identify the building within which the mobile device is located; and obtain or access a building model for the building. The building model defines one or more perimeter portions of the building and each respective perimeter portion of the one or more perimeter portions corresponding to one or more respective exterior walls of the building. The computer-readable program code and/or instructions portions comprise executable portions further configured, when executed by a processor of an apparatus, to cause the apparatus to identify a particular perimeter portion of the one or more perimeter portions that corresponds to the building-perimeter feature represented by the image based at least in part on (i) one or more of the orientation or the location of the mobile device with respect to the identified geometric plane defined by the building-perimeter feature and (ii) the orientation of the mobile device with respect to the defined geographical direction. The computer-readable program code and/or instructions portions comprise executable portions further configured, when executed by a processor of an apparatus, to cause the apparatus to determine and/or provide location information that corresponds to or is based on the particular perimeter portion that was identified. The location information represents where the mobile device is or was located substantially when the image was captured.

In an example embodiment, the building-perimeter feature is a window.

In an example embodiment, the geometric plane defined by the building-perimeter feature is determined based at least in part on at least one of (a) a horizontal edge of the building-perimeter feature within the image or (b) a vertical edge of the building-perimeter feature within the image.

In an example embodiment, the geometric plane defines a feature direction that is normal to the geometric plane and identifying the particular perimeter portion of the one or more perimeter portions that corresponds to the building-perimeter feature comprises comparing the feature direction and a perimeter direction of the particular perimeter portion.

In an example embodiment, the geometric plane is identified in the image by a feature detector operating on the mobile device.

In an example embodiment, the feature detector is a machine-learning trained classifier.

In an example embodiment, the sensor data comprises at least one of (a) magnetic data or (b) acceleration data and the one or more sensors of the mobile device comprise at least one of (a) a magnetic sensor or (b) an accelerometer.

In an example embodiment, the computer-readable program code and/or instructions portions comprise executable portions further configured, when executed by a processor of an apparatus, to cause the apparatus to, prior to determining the location information, obtain an indication that a location of the mobile device with respect to the exterior wall feature satisfies one or more proximity criteria, wherein the indication is generated based at least in part on processing of the image.

In an example embodiment, a determination that the location of the mobile device with respect to the exterior wall feature satisfies the one or more proximity criteria is performed by a machine-learning trained artificial neural network trained to detect the building-perimeter feature in the image.

In an example embodiment, the building within which the mobile device is located is determined based at least in part on at least one of (a) an identifier of a wireless signal observed by the mobile device within a particular time period with respect to the capturing of the image, (b) a global navigation satellite system (GNSS) position estimate determined within a particular time period with respect to the capturing of the image, or (c) a final GNSS position estimate determined prior to the mobile device entering the building.

In an example embodiment, the computer-readable program code and/or instructions portions comprise executable portions further configured, when executed by a processor of an apparatus, to cause the apparatus to obtain radio observation data captured by the mobile device at substantially a same time as the image was captured; and at least one of (a) provide the radio observation data or (b) use the radio observation data in association with the location information to update a radio map.

In an example embodiment, the computer-readable program code and/or instructions portions comprise executable portions further configured, when executed by a processor of an apparatus, to cause the apparatus to use the determination that the mobile device was located within the building proximate the particular perimeter portion corresponding to the building-perimeter feature when the image was captured as input to a hybrid positioning algorithm.

In an example embodiment, the computer-readable program code and/or instructions portions comprise executable portions further configured, when executed by a processor of an apparatus, to cause the apparatus to cause a user interface of the mobile device to display a position estimate of the mobile device based at least in part on the location information and/or the identified particular perimeter portion.

According to yet another aspect, an apparatus is provided. In an example embodiment, the apparatus comprises means for identifying, within an image captured by an imaging device of a mobile device, a geometric plane defined by a building-perimeter feature represented by the image. The building-perimeter feature is part of or connected to an exterior wall of a building within which the mobile device is located. The apparatus comprises means for determining one or more of an orientation or a location of the mobile device with respect to the identified geometric plane defined by the building-perimeter feature. The apparatus comprises means for determining an orientation of the mobile device with respect to a defined geographical direction based at least in part on sensor data captured by one or more sensors of the mobile device. The apparatus comprises means for identifying the building within which the mobile device is located. The apparatus comprises means for obtaining or accessing a building model for the building. The building model defines one or more perimeter portions of the building and each respective perimeter portion of the one or more perimeter portions corresponding to one or more respective exterior walls of the building. The apparatus comprises means for identifying a particular perimeter portion of the one or more perimeter portions that corresponds to the building-perimeter feature represented by the image based at least in part on (i) one or more of the orientation or the location of the mobile device with respect to the identified geometric plane defined by the building-perimeter feature and (ii) the orientation of the mobile device with respect to the defined geographical direction. The apparatus comprises means for determining and/or providing location information that corresponds to or is based on the particular perimeter portion that was identified. The location information represents where the mobile device is or was located substantially when the image was captured.

BRIEF DESCRIPTION OF THE DRAWINGS

Figure 1:
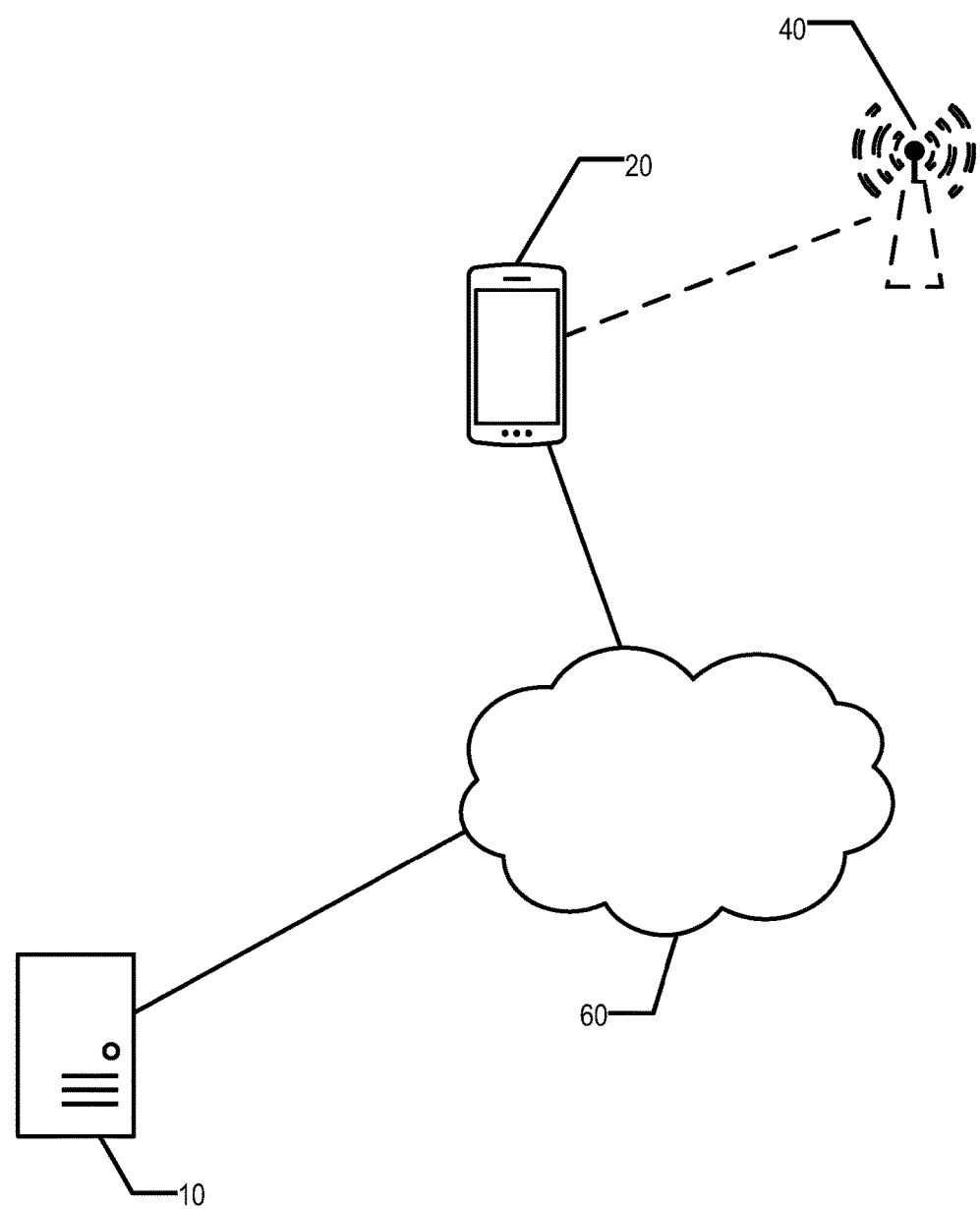
Figure 2A:
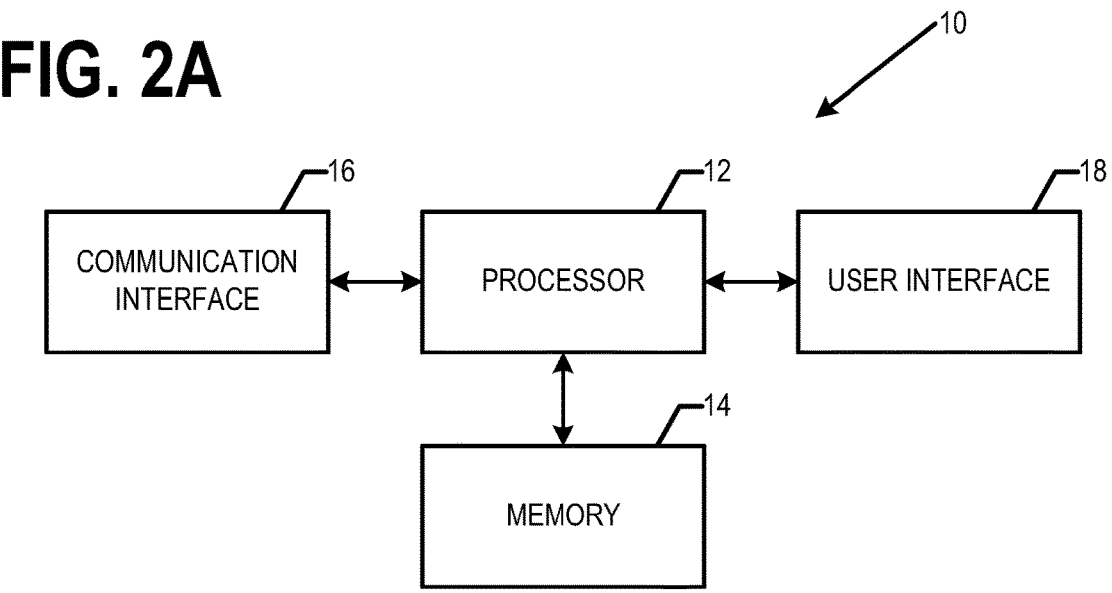
Figure 2B:
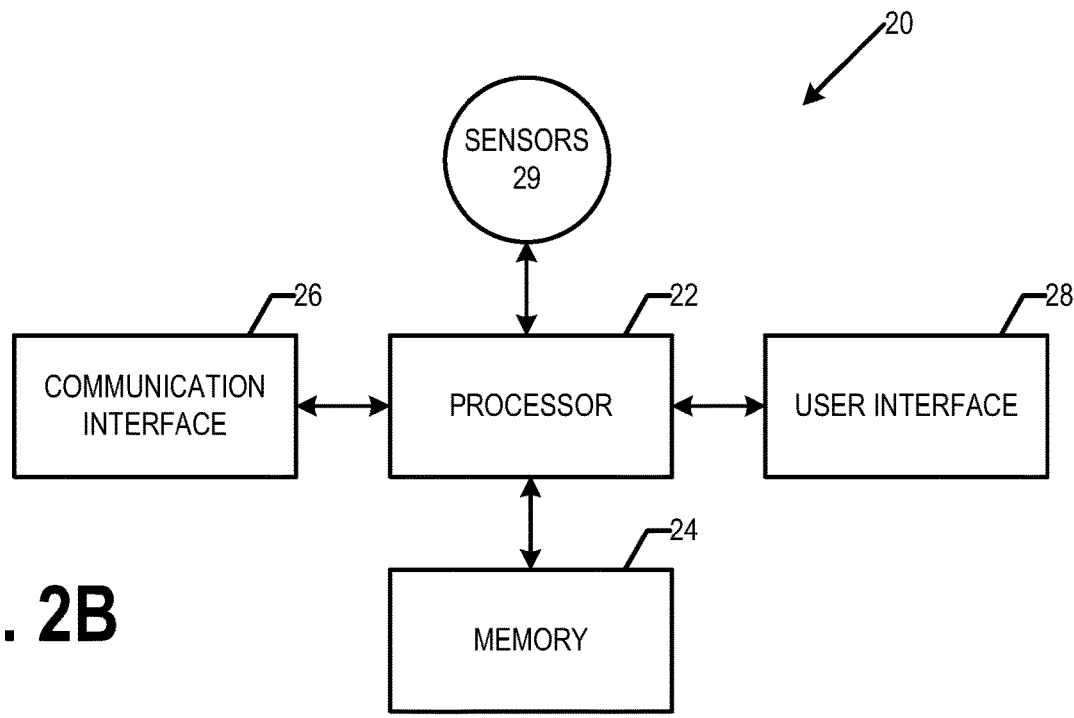
Figure 3:
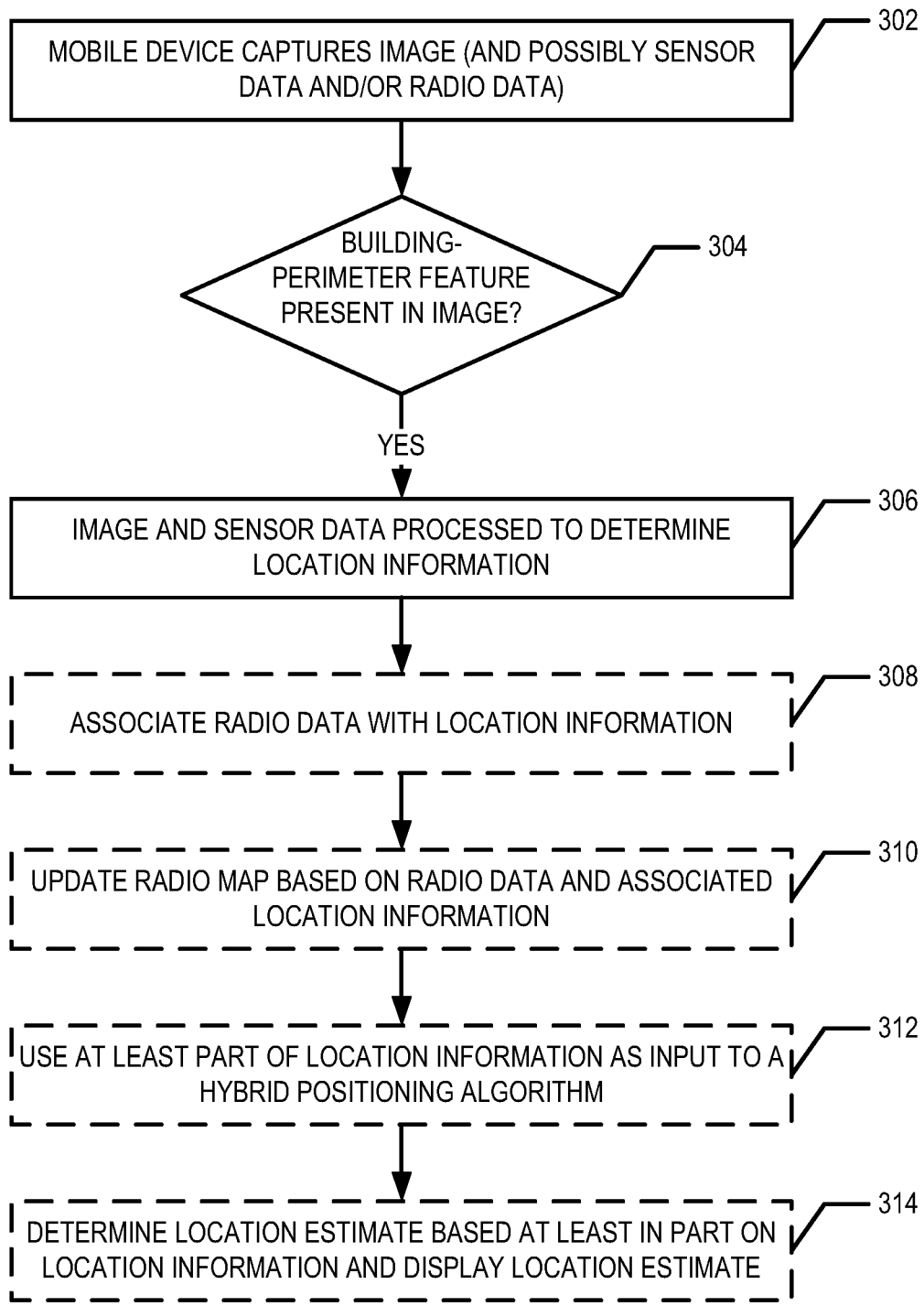
Figure 4:
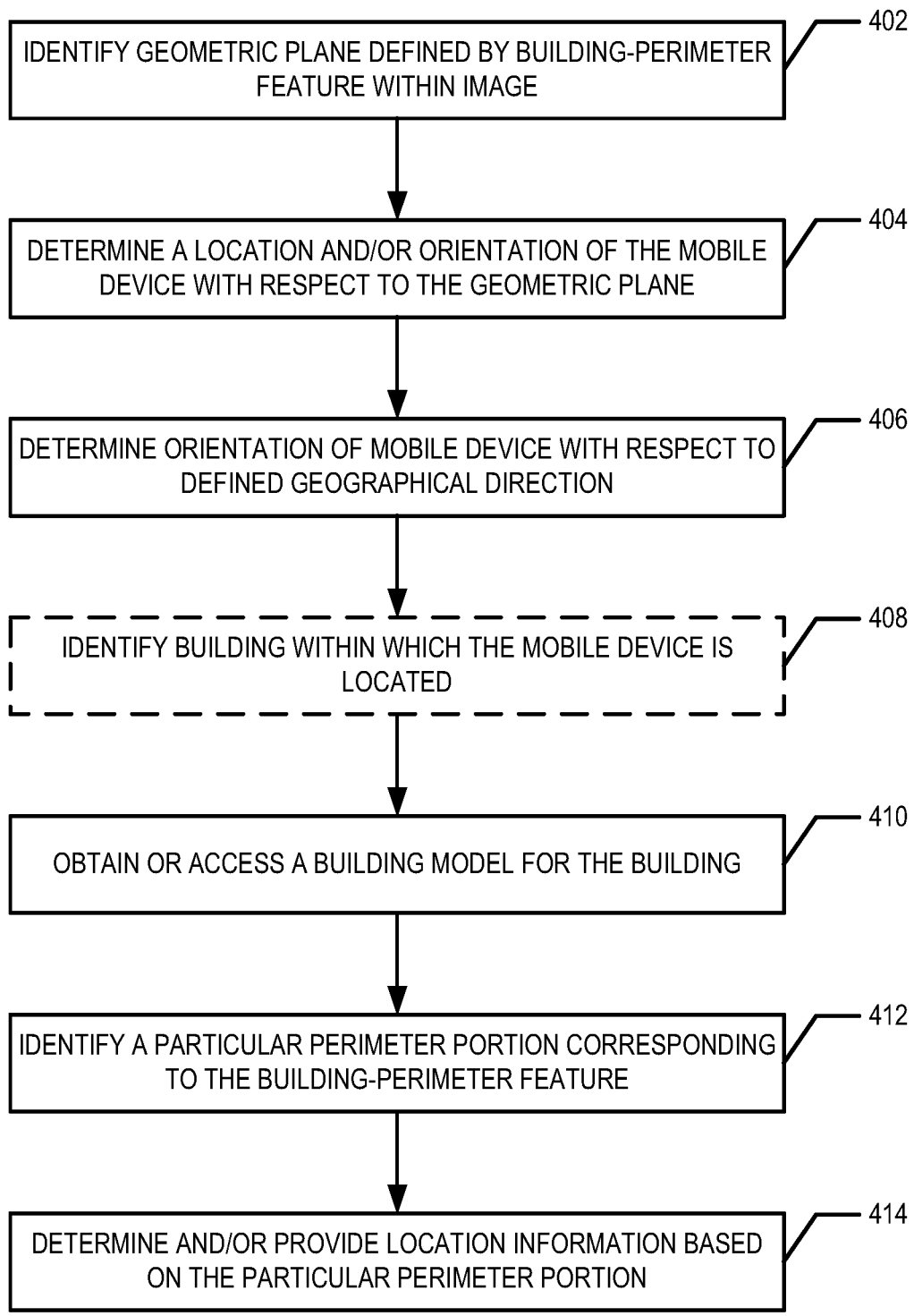
Figure 5:
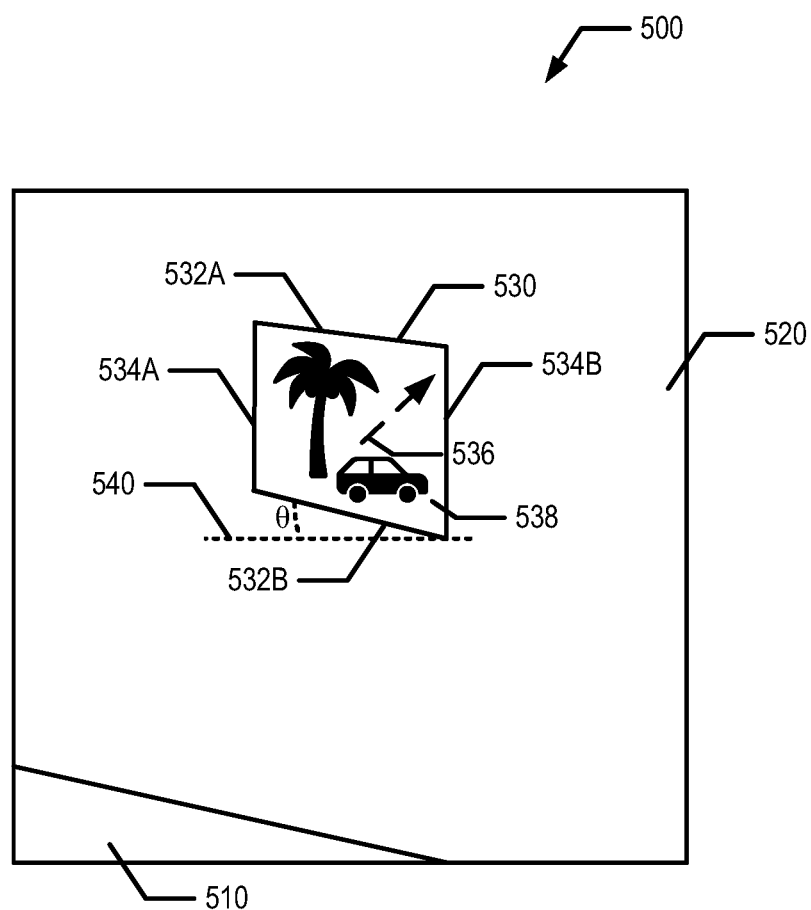
Figure 6:
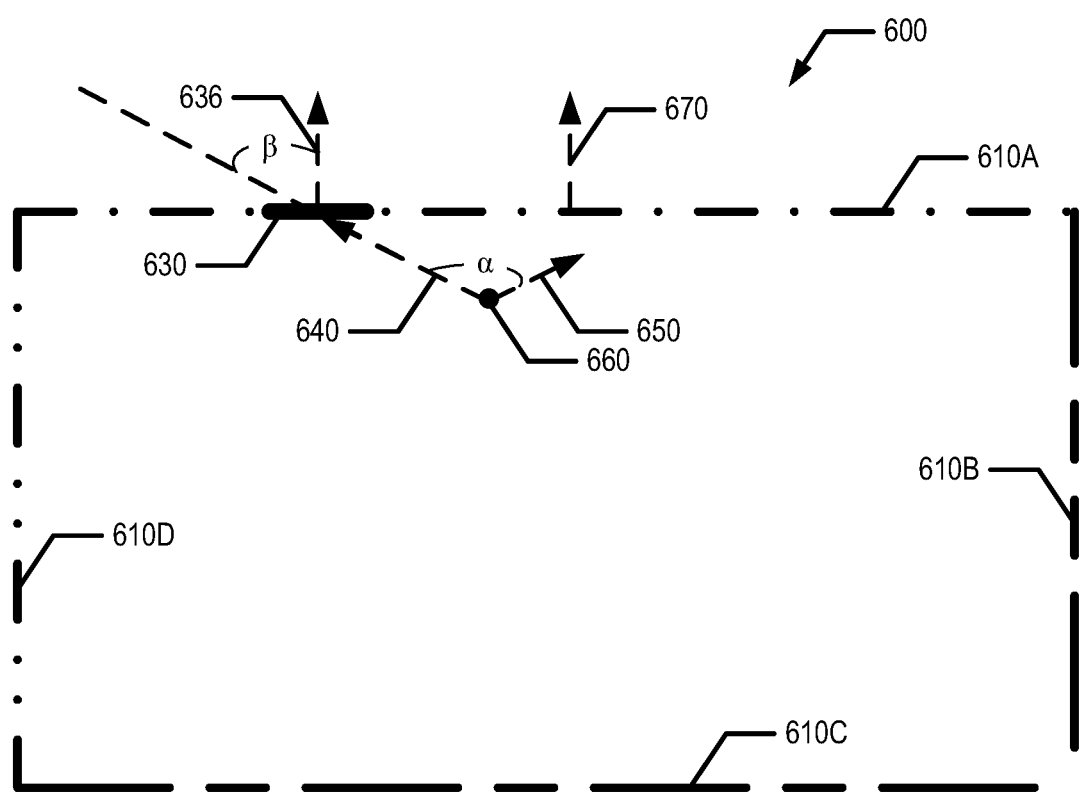

Having thus described certain example embodiments in general terms, reference will hereinafter be made to the accompanying drawings, which are not necessarily drawn to scale, and wherein:

FIG. 1 is a block diagram showing an example system of one embodiment of the present disclosure;

FIG. 2A is a block diagram of a network device that may be specifically configured in accordance with an example embodiment;

FIG. 2B is a block diagram of a mobile device that may be specifically configured in accordance with an example embodiment;

FIG. 3 is a flowchart illustrating operations performed, such as by the network device of FIG. 2A and/or mobile device of FIG. 2B, in accordance with an example embodiment;

FIG. 4 is a flowchart illustrating operations performed, such as by the network device of FIG. 2A or mobile device of FIG. 2B, in accordance with an example embodiment;

FIG. 5 illustrates an example of an image captured by mobile device that comprises a building-perimeter feature, in accordance with an example embodiment; and FIG. 6 illustrates an example building model, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values and/or tolerances that are within manufacturing and/or engineering guidelines and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Various embodiments provide methods, apparatus, systems, and computer program products for identifying building-perimeter features within an image or other imaging sensor data captured by one or more sensors of a mobile device and determining location information corresponding to the location of the mobile device when the image or other imaging sensor data was captured. A building-perimeter feature is a feature that is identifiable within an image or other form of sensor data (e.g., LiDAR point cloud, RADAR point cloud, sonar data, and/or the like) that corresponds to a part of the perimeter of a building. For example, in various embodiments, the building-perimeter feature is part of and/or connected to an exterior wall of a building within which the mobile device is located. An example of a building-perimeter feature is a window that is part of a perimeter of a building (e.g., located in an exterior wall or door of the building). In various embodiments, the determined location information is used as input to a position estimate algorithm such that a position estimate of the mobile device is determined based at least in part on the location information, used to associate radio data captured by the mobile device with a position within and/or a portion of the building, and/or the like.

In various scenarios, it is desirable to determine the location of a mobile device. In many situations, Global Navigation Satellite System (GNSS)-based position estimates may be used for determining the location of a mobile device. However, GNSS-based position estimates are generally not available and/or not reliable for indoor position determination. Radio-based positioning has been proposed as a solution to the indoor positioning problem. Such radio-based positioning relies on radio signals (e.g., cellular signals, Wi-Fi signals, Bluetooth, Bluetooth Low Energy (BLE), and/or the like) generated and/or transmitted by radio nodes and observed by the mobile device to determine a position estimate for the mobile device. This requires that the respective locations of the radio nodes are well known.

Determining the location of a radio node using GNSS-based positioning is generally insufficient as radio nodes are often located indoors where GNSS-based positioning is not reliable. Inertial-based positioning (e.g., positioning based on measured movement of the mobile device) tends to diverge quickly and requires regular additional location input (e.g., absolute location, relation to a reference location, and/or the like). As such, problems regarding determining the location of a mobile device in an indoor environment exist. For example, a problem exists regarding how to provide additional information regarding the relationship between a mobile device's location with respect to a reference location of the mobile device such that a position estimate for the mobile device can be determined, the respective locations of one or more radio nodes of the mobile device may be determined, and/or the like.

Various embodiments provide technical solutions to these technical problems. In particular, various embodiments enable the determination of location information that may include and/or indicate when a mobile device is located proximate a perimeter of a building or other indoor environment, which part of the perimeter of the building or other indoor environment that the mobile device is proximate, an orientation of the mobile device with respect to the part of the perimeter of the building, a distance of the mobile device from the part of the perimeter of the building, and/or the like. This location information can be used as input to a position estimate algorithm, used to determine a location of a radio node, and/or the like. Thus, various embodiments provide improvements to the field of indoor location determination and/or indoor positioning.

II. Example System Architecture

FIG. 1 provides an illustration of an example system that can be used in conjunction with various embodiments of the present invention. As shown in FIG. 1, the system includes one or more network devices 10, one or more mobile devices 20, one or more networks 60, and/or the like. In an example embodiment, the network device 10 is a server, group of servers, distributed computing system, part of a cloud-based computing system, and/or other computing system. In various embodiments, a mobile device 20 is a dedicated space learning data collection device (e.g., a mobile data gathering platform), a smartphone, a tablet, a personal digital assistant (PDA), and/or the like. In an example embodiment, the system includes one or more radio nodes 40. In various embodiments, the network device 10 communicates with one or more mobile devices 20 via one or more wired or wireless networks 60.

In various embodiments, the system further includes one or more radio nodes 40. In various embodiments, the radio nodes 40 are wireless network access points and/or gateways such as Wi-Fi network access points, cellular network access points, Bluetooth access points, and/or other radio frequency-based network access points. In various embodiments, the one or more radio nodes 40 may be and/or comprise other radio nodes (e.g., in addition to and/or instead of access points) such as beacons, active radio frequency identifier (RFID) tags, and/or the like. In an example embodiment, a mobile device 20 may communicate (via one-way communication and/or two-way communication) with one or more radio nodes 40 via wireless communication (e.g., radio signals). For example, a mobile device 20 may observe a radio signal that was emitted, transmitted, generated, and/or broadcasted by a radio node 40.

In an example embodiment, a network device 10 may comprise components similar to those shown in the example network device 10 diagrammed in FIG. 2A. In an example embodiment, the network device 10 is configured to obtain an image and/or other imaging sensor data and/or information extracted and/or determined by processing the image and/or other sensor data; identify a geometric plane defined within the image and/or other imaging sensor data by a building-perimeter feature; determining an orientation and/or location of a mobile device with respect to the identified geometric plane defined by the building-perimeter feature; determine an orientation of the mobile device with respect to a defined geographical direction; identify a building within which the mobile device is located; obtain a building model for the building that the mobile devices is located within; identify a particular perimeter portion of the building model that corresponds to the building-perimeter feature determined to be present in and/or represented by the image and/or other imaging sensor data; determine location information that corresponds to and/or is based at least in part on the particular perimeter portion; and/or the like.

For example, as shown in FIG. 2A, the network device 10 may comprise a processor 12, memory 14, a user interface 18, a communications interface 16, and/or other components configured to perform various operations, procedures, functions, or the like described herein. In various embodiments, the network device 10 stores a geographical database, digital map, and/or positioning map, such as a radio map, computer program code and/or instructions for performing various functions described herein, and/or the like (e.g., in memory 14), for example. In at least some example embodiments, the memory 14 is non-transitory.

In an example embodiment, the mobile device 20 is configured to capture an image and/or other imaging sensor data; capture sensor data (magnetic data, acceleration data, radio data, and/or the like); identify a geometric plane defined within the image and/or other imaging sensor data by a building-perimeter feature; determining an orientation and/or location of the mobile device 20 with respect to the identified geometric plane defined by the building-perimeter feature; determine an orientation of the mobile device with respect to a defined geographical direction (e.g., based at least in part on the sensor data such as magnetic data, acceleration data, and/or the like); identify a building within which the mobile device is located; obtain a building model for the building that the mobile devices is located within; identify a particular perimeter portion of the building model that corresponds to the building-perimeter feature determined to be present in and/or represented by the image and/or other imaging sensor data; determine location information that corresponds to and/or is based at least in part on the particular perimeter portion; and/or the like.

In an example embodiment, the mobile device 20 is a mobile computing device such as a mobile data gathering platform, smartphone, tablet, laptop, PDA, navigation system, an Internet of things (IoT) device, and/or the like. In an example embodiment, as shown in FIG. 2B, the mobile device 20 may comprise a processor 22, memory 24, a communications interface 26, a user interface 28, one or more sensors 29 and/or other components configured to perform various operations, procedures, functions or the like described herein. In various embodiments, the mobile device 20 stores at least a portion of one or more digital maps (e.g., geographic databases, positioning maps, radio maps, and/or the like) and/or computer executable instructions for performing various functions described herein, and/or the like in memory 24. In at least some example embodiments, the memory 24 is non-transitory.

In various embodiments, the sensors 29 comprise one or more motion and/or IMU sensors, one or more GNSS sensors, one or more radio sensors, one or more imaging sensors and/or devices, one or more audio sensors, and/or other sensors. In an example embodiment, the one or more motion and/or IMU sensors comprise one or more accelerometers, gyroscopes, magnetometers, barometers, and/or the like. In various embodiments, the one or more GNSS sensor(s) are configured to communicate with one or more GNSS satellites and determine GNSS-based position estimates and/or other information based on the communication with the GNSS satellites. In various embodiments, the one or more radio sensors comprise one or more radio interfaces configured to observe and/or receive signals emitted, generated, transmitted, and/or broadcasted by one or more radio nodes 40 and/or other computing entities. For example, the one or more interfaces may be configured (possibly in coordination with processor 22) to determine a locally unique identifier, globally unique identifier, and/or operational parameters of a radio node 40 observed by the radio sensor(s). As used herein, a radio sensor observes a radio node 40 by receiving, capturing, measuring and/or observing a (radio frequency) signal emitted, generated, transmitted, and/or broadcasted by the radio node 40. In an example embodiment, the interface of a radio sensor may be configured to observe one or more types of signals such as generated and/or transmitted in accordance with one or more protocols such as 5G, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. For example, the interface of a radio sensor may be configured to observe signals of one or more modern global cellular formats such as GSM, WCDMA, TD-SCDMA, LTE, LTE-A, CDMA, NB-IoT and/or non-cellular formats such as WLAN, Bluetooth, Bluetooth Low Energy (BLE), Zigbee, Lora, and/or the like. For example, the interface(s) of the radio senor(s) may be configured to observe radio, millimeter, microwave, and/or infrared wavelength signals. In an example embodiment, the interface of a radio sensor may be coupled to and/or part of a communications interface 26. In various embodiments, the sensors 29 may further comprise one or more imaging sensors and/or devices configured to capture images and/or imaging sensor data, such as digital camera(s); 3D cameras; 360° cameras; image sensors; two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras, and/or the like. In various embodiments, the one or more sensors 29 comprise one or more audio sensors such as one or more microphones.

Each of the components of the system may be in electronic communication with, for example, one another over the same or different wireless or wired networks 60 including, for example, a wired or wireless Personal Area Network (PAN), Local Area Network (LAN), Metropolitan Area Network (MAN), Wide Area Network (WAN), cellular network, and/or the like. In an example embodiment, a network 60 comprises the automotive cloud, digital transportation infrastructure (DTI), radio data system (RDS)/high definition (HD) radio or other digital radio system, and/or the like. For example, a mobile device 20 may be in communication with a network device 10 via the network 60. For example, a mobile device 20 may communicate with the network device 10 via a network, such as the Cloud. For example, the Cloud may be a computer network that provides shared computer processing resources and data to computers and other devices connected thereto.

For example, the mobile device 20 captures an image and corresponding sensor data (e.g., magnetic data, acceleration data, radio date, and/or the like) and provides the image and the corresponding sensor data such that the network device 10 receives the image and the corresponding sensor data via the network 60, in an example embodiment. As used herein, sensor data corresponds to an image when the sensor data was captured respective by sensors 29 of the mobile device 20 while the mobile device 20 was in substantially the same location as when the image (e.g., the imaging sensor data of the image) was captured. In an example embodiment, the mobile device 20 determines location data based on a building-perimeter feature identified in an image and/or imaging sensor data captured by mobile device 20 and provides the location data and radio data corresponding to the image and/or imaging sensor data such that the network device 10 receives the location data and the radio data corresponding to the image and/or imaging sensor data via the network 60. For example, the network device 10 may be configured to receive image(s) and/or imaging sensor data, corresponding sensor data, location information, and/or the like and/or to provide positioning estimates and/or at least portions of a radio map via the network 60.

Certain example embodiments of the network device 10 and mobile device 20 are described in more detail below with respect to FIGS. 2A and 2B.

III. Example Operation(s)

In various embodiments, a mobile device 20 captures an image and/or imaging sensor data via one or more imaging sensors and/or devices 29 thereof. In various embodiments, at substantially the same time and/or at substantially the same location, the mobile device 20 captures corresponding sensor data (e.g., magnetic data captured via a magnetic sensor such as a magnetometer, acceleration data captured via an acceleration sensor and/or accelerometer, radio data captured by a radio interface, and/or the like). In various embodiments, the mobile device 20 provides (e.g., transmits) the image and/or imaging sensor data and the corresponding sensor data (e.g., for receipt by a network device 10) and/or identifies a geometric plane defined by a building-perimeter feature. In an example embodiment, the mobile device 20 provides (e.g., transmits) information regarding the identified geometric plane and the corresponding sensor data (e.g., for receipt by a network device 10). Based at least in part on the identified geometric plane and the corresponding sensor data, location information corresponding to the location of the mobile device when the image and/or sensor data was captured is determined. The location information may then be used as input to a positioning algorithm used to estimate future and/or past positions of the mobile device 20, used to update a radio map (e.g., based on corresponding radio data), used to perform one or more positioning and/or navigation-related functions, and/or the like.

FIG. 3 provides a flowchart illustrating various processes, procedures, operations, and/or the like for determining the location information and using the location information, in accordance with an example embodiment. Starting at block 302, a mobile device 20 captures an image and/or imaging sensor data comprising a representation of at least a portion of the environment around the mobile device 20. For example, the mobile device 20 may comprise means, such as processor 22, memory 24, sensors 29, and/or the like, for capturing an image and/or imaging sensor data comprising a representation of at least a portion of the environment surrounding the mobile device 20.

For example, an application and/or program operating on the mobile device 20 (e.g., having executable instructions stored in memory 24 and being executed by processor 22) may cause the sensors 29 to capture an image and/or imaging sensor data. In various embodiments, the mobile device 20 may also capture sensor data such as magnetic data (via a magnetic sensor and/or magnetometer), acceleration data (via one or more acceleration sensors and/or accelerometers), radio data (via one or more radio sensors and/or radio interfaces), and/or the like. For example, the application and/or program operating on the mobile device 20 may cause the sensors 29 to capture magnetic data, acceleration data, radio data, and/or the like at substantially the same time and/or position as the capturing of the image and/or the imaging sensor data.

In various embodiments, the magnetic data comprises an observed magnetic field strength and/or an observed magnetic field direction at the location of the mobile device 20. In various embodiments, the acceleration data comprises an acceleration value and a corresponding direction of acceleration. In an example embodiment, the acceleration data comprises one or more observed acceleration values each associated with a respective direction. In an example embodiment, the radio data comprises information regarding the observation of one or more radio nodes 40 by the mobile device 20. For example, the radio data may comprise a radio node identifier configured to identify an observed radio node 40; a signal strength indicator configured to indicate the observed signal strength of the observed radio signal emitted, generated, transmitted, and/or broadcasted by the radio node 40; a one way and/or round-trip timing parameter corresponding to the observed radio signal; a frequency and/or frequency band of the observed radio signal; a transmission interval of the observed radio signal; and/or other information characterizing the observation of the radio node 40 by the mobile device 20 at substantially the same time and/or location as the capturing of the image and/or imaging sensor data.

At block 304, the image and/or imaging sensor data is processed and/or analyzed to determine whether a representation of a building-perimeter feature is present in the image and/or imaging sensor data. For example, in various embodiments, the mobile device 20 may process and/or analyze the image and/or imaging sensor data to determine whether a representation of a building-perimeter feature is present in the image and/or imaging sensor data. For example, the mobile device 20 may comprise means, such as processor 22, memory 24, and/or the like, for processing and/or analyzing the image and/or imaging sensor data to determine whether a representation of a building-perimeter feature is present in the image and/or imaging sensor data.

For example, in various embodiments, the mobile device 20 may provide the image and/or imaging sensor data such that the network device 10 receives the image and/or imaging sensor data and the network device 10 processes and/or analyzes the image and/or imaging sensor data to determine whether a representation of a building-perimeter feature is present in the image and/or imaging sensor data. For example, the mobile device 20 may comprise means, such as processor 22, memory 24, communication interface 26, and/or the like, for providing the image and/or imaging sensor data. The network device 10 may comprise means, such as processor 12, memory 14, communication interface 16, and/or the like, for receiving the image and/or imaging sensor data and may comprise means, such as processor 12, memory 14, and/or the like, for processing and/or analyzing the image and/or imaging sensor data to determine whether a representation of a building-perimeter feature is present in the image and/or imaging sensor data.

Various image and/or imaging sensor data processing and/or analyzing techniques may be used to determine whether a representation of a building-perimeter feature is present in the image and/or imaging sensor data. In an example embodiment, the image and/or imaging sensor data is analyzed and/or processed to identify parallel lines defined within the image and/or imaging sensor data, vertical lines within the image and/or imaging sensor data, horizontal line within the image and/or imaging sensor data, lines within the image that are the two dimensional projection of vertical and/or horizontal lines in the real world three dimensional space, and/or the like. In an example embodiment, a machine-learning trained model (e.g., a classifier, a building-perimeter feature identification engine, and/or the like) is used to process and/or analyze the image and/or imaging sensor data to determine whether a representation of a building-perimeter feature is present in the image and/or imaging sensor data. For example, a model may be trained using a machine-learning technique to identify and/or recognize at least some representations of building-perimeter features within images and/or imaging sensor data.

When it is determined, at block 304, that the image and/or imaging sensor data does not include a representation of a building-perimeter feature, the process may stop and/or may return to block 302, in various embodiments. When it is determined, at block 304, that the image and/or imaging sensor data does include a representation of a building-perimeter feature, the process may proceed to block 306.

At block 306, the image and/or imaging sensor data and corresponding sensor data (e.g., magnetic data, acceleration data, and/or the like) are processed and/or analyzed to determine location information. The location information provides an indication of the location and/or position of the mobile device 20 when the mobile device 20 captured the image and/or imaging sensor data and the corresponding sensor data. For example, in an example embodiment, the location information comprises an indication of a portion of the perimeter of the building that the mobile device 20 was located near, adjacent, and/or in proximity to when the mobile device 20 captured the image and/or imaging sensor data and the corresponding sensor data.

In an example embodiment, the mobile device 20 performed block 304 and processes and/or analyzes the image and/or imaging sensor data and the corresponding sensor data to determine the location information. For example, the mobile device 20 may comprise means, such as processor 22, memory 24, and/or the like for processing and/or analyzing the image and/or imaging sensor data and corresponding sensor data to determine location information based at least in part thereon.

In an example embodiment, the mobile device 20 performed block 304 and provides (e.g., transmits) the image and/or imaging sensor data (and/or information extracted therefrom) and the corresponding sensor data such that the network device 10 receives the image and/or imaging sensor data (and/or information extracted therefrom) and the corresponding sensor data. The network device 10 then processes and/or analyzes the image and/or imaging sensor data and the corresponding sensor data to determine location information based at least in part thereon. For example, the mobile device 20 may comprise means, such as processor 22, memory 24, communication interface 26, and/or the like, for providing the image and/or imaging sensor data (and/or information extracted therefrom) and the corresponding sensor data. For example, the network device 10 may comprise means, such as processor 12, memory 14, communication interface 16, and/or the like, for receiving the image and/or imaging sensor data (and/or information extracted therefrom) and the corresponding sensor data and processing and/or analyzing the image and/or imaging sensor data (and/or information extracted therefrom) and the corresponding sensor data to determine location information based at least in part thereon.

In an example embodiment, the network device 10 performed block 304 and the network device 10 processes and/or analyzes the image and/or imaging sensor data (and/or information extracted therefrom) and the corresponding sensor data to determine location information based thereon. For example, the network device 10 comprises means, such as processor 12, memory 14, and/or the like, for processing and/or analyzing the image and/or imaging sensor data (and/or information extracted therefrom) and the corresponding sensor data to determine location information based at least in part thereon.

For example, in various embodiments, the image and/or imaging sensor data is processed and/or analyzed to determine an orientation of the mobile device 20 with respect to the building-perimeter feature. In various embodiments, the corresponding sensor data (e.g., magnetic data, acceleration data, and/or the like) is processed and/or analyzed to determine an orientation of the mobile device 20 with respect to a defined geographical direction (e.g., a defined compass pointing, North, South, East, West, Northeast, Northwest, Southeast, Southwest, and/or the like).

In various embodiments, a 2D, 2.5D, and/or 3D building model of the building that the mobile device 20 is located within may be accessed, retrieved, read, requested and received, and/or the like. In various embodiments, the orientation of the mobile device 20 with respect to the building-perimeter feature and/or the orientation of the mobile device 20 with respect to the defined geographical direction and at least a portion of the building model are used to determine and/or identify a perimeter portion of the building model that represents a part of the perimeter of the building that the mobile device 20 is near, adjacent, and/or proximate to (e.g., the perimeter portion of the building model that represents the exterior wall that the building-perimeter feature is part of and/or attached to).

In an example embodiment, at block 308, radio data corresponding to the image and/or imaging sensor data is associated with the location information. For example, the network device 10 and/or mobile device 20 associates the radio data corresponding to the image and/or imaging sensor data with the location information. For example, the network device 10 and/or the mobile device 20 may comprise means, such as processor 12, 22, memory 14, 24, and/or the like, for associating the radio data corresponding to the image and/or imaging sensor data with the location information. For example, associating the radio data with the location information may include updating metadata associated with the radio data to indicate that the radio data was captured at a location and/or position indicated to by the location information. In an example embodiment, the radio data is provided. For example, when the mobile device 20 may provide the radio data (possibly in association with the location information) such that the network device 10 receives the radio data such that the network device 10 may use the radio data to generate and/or update a radio map, for example.

In an example embodiment, at block 310, a radio map is updated, generated, and/or the like based on the radio data and the associated location information. For example, the network device 10 and/or mobile device 20 updates, generates, and/or the like a radio map based at least in part on the radio data and the associated location information. For example, the network device 10 and/or the mobile device 20 may comprise means, such as processor 12, 22, memory 14, 24, and/or the like, for updating, generating, and/or the like a radio map based at least in part on the radio data and the associated location information. For example, the radio map may be updated and/or generated to include information regarding observations of one or more radio nodes 40 by the mobile device 20 (as indicated by the radio data) may be associated with a location and/or position indicated by the location information. For example, if the radio data comprises a signal strength measurement for a first radio node 40 and the location information indicates that the mobile device 20 was proximate the North wall of the building when the radio data (and the corresponding image and/or imaging sensor data was captured), the signal strength measurement for the first radio node may be associated with at least a portion of the northern perimeter of the building. The radio map may be stored by the network device 10 and/or mobile device 20 (e.g., in memory 14, 24); provided (e.g., transmitted) to one or more other computing entities; used by the network device 10, mobile device 20 and/or one or more other computing entities to perform one or more positioning and/or navigation-related functions, and/or the like.

In an example embodiment, at block 312, the location information is provided as input to a hybrid positioning algorithm and/or other positioning algorithm. A hybrid positioning algorithm is an algorithm that uses different types of sensors 29 (and sensor data captured thereby) of a mobile device 20 to determine a position estimate for the mobile device 20. For example, a hybrid positioning algorithm may use GNSS sensor data, motion and/or IMU sensor data, radio data, and/or the like to determine a position estimate. The network device 10 and/or mobile device 20 provides the location information as input to the hybrid positioning algorithm and/or other positioning algorithm. For example, the network device 10 and/or mobile device 20 comprises means, such as processor 12, 22, memory 14, 24, and/or the like, for providing the location information as input to the hybrid positioning algorithm and/or other positioning algorithm.

In an example embodiment, at block 314, the hybrid positioning algorithm and/or other positioning algorithm is executed and/or performed to determine and/or generate a position estimate for the mobile device 20. For example, the network device 10 and/or mobile device 20 may then execute and/or perform the positioning algorithm (e.g., execute executable instructions configured to cause the positioning algorithm to be performed) to determine and/or generate a position estimate for the mobile device 20 based at least in part on the location information. For example, the network device 10 and/or the mobile device 20 may comprise means, such as processor 12, 22, memory 14, 24, and/or the like, for executing and/or performing the hybrid positioning algorithm and/or other positioning algorithm to determine and/or generate a position estimate for the mobile device 20. For example, a position estimate for the mobile device 20 may be determined based at least in part on the location information (e.g., using a hybrid positioning algorithm).

In various embodiments, the position estimate may be used (e.g., by the network device 10 and/or the mobile device 20) to perform one or more positioning and/or navigation-related functions. Some non-limiting examples of positioning and/or navigation-related functions include providing a route or information corresponding to a geographic area/portion of the building (e.g., via a user interface), localization, localization visualization, route determination, operating a vehicle along at least a portion of a route, route travel time determination, route guidance, vehicle trajectory determination and/or guidance, vehicle speed and/or handling control, route and/or maneuver visualization, and/or the like. For example, in an example embodiment, the position estimate may be displayed (e.g., as a layer of a digital map, as an overlay of a digital map, and/or the like) via display of a user interface 18, 28. In an example embodiment, the position estimate is used to determine the origin and/or starting location for a route. In an example embodiment, the position estimate is used to perform a route visualization (e.g., displayed via a user interface 18, 28).

FIG. 4 provides a flowchart illustrating various processes, procedures, operations, and/or the like, for determining location information based at least in part on an image and/or imaging sensor data and corresponding sensor data. For example, in various embodiments, the processes, procedures, operations, and/or the like of FIG. 4 are performed as part of block 306.

Starting at block 402, a geometric plane defined by the building-perimeter feature within the image and/or the imaging sensor data is identified. For example, the network device 10 and/or the mobile device 20 identifies a geometric plane defined by the building-perimeter feature within the image and/or imaging sensor data. For example, the network device 10 and/or the mobile device 20 comprises means, such as processor 12, 22, memory 14, 24, and/or the like, for identifying a geometric plane defined by the building-perimeter feature within the image and/or imaging sensor data. For example, the horizontal and/or vertical edges of the building-perimeter feature within the image may be identified such that a geometric plane within the image and/or imaging sensor data is defined thereby.

In an example embodiment, identifying the geometric plane defined by the building-perimeter feature comprises determining a feature direction. In various embodiments, the feature direction is an outward pointing normal vector of the geometric plane. For example, in an example embodiment, the feature direction is direction that is perpendicular to the geometric plane defined by the building-perimeter feature and that points out from and/or away from the interior of the building. In an example embodiment, the direction of gravity is determined based at least in part on corresponding acceleration data to provide an approximation of a vertical direction and the feature direction is defined to be perpendicular to the direction of gravity. In an example embodiment, a vertical direction is determined based at least in part on the vertical vanishing point formed by the vertical edges defining the geometric plane and the feature direction is defined to be perpendicular to the vertical direction. In various embodiments, the feature direction is defined based at least in part on the horizontal vanishing point formed by the horizontal edges that define the geometric plane and the pitch and roll angles of the mobile device 20 defined based on the direction of gravity and/or on the vertical vanishing point formed by the vertical edges defining the geometric plane.

In an example embodiment, identifying the geometric plane is performed as part of block 304. For example, part of the process of determining whether a building-perimeter feature is within the image and/or imaging sensor data may comprise attempting to identify a geometric plane of one or more possible building-perimeter features within the image and/or imaging sensor data and, when the geometric plane of a possible building-perimeter feature is identified, determining that a building-perimeter feature is present in the image and/or imaging sensor data.

Various image and/or imaging sensor data processing and/or analyzing techniques may be used to identify a geometric plane defined by a building-perimeter feature in the image and/or imaging sensor data. In an example embodiment, the image and/or imaging sensor data is analyzed and/or processed to identify parallel lines defined within the image and/or imaging sensor data, vertical lines within the image and/or imaging sensor data, horizontal lines within the image and/or imaging sensor data, lines within the image that are the two dimensional projection of vertical and/or horizontal lines in the real world three dimensional space, and/or the like. The parallel lines, vertical lines, and/or horizontal lines identified are used to define the geometric plane. In an example embodiment, a machine-learning trained model (e.g., a classifier, a building-perimeter feature identification engine, and/or the like) is used to process and/or analyze the image and/or imaging sensor data to identify a geometric plane defined by a building-perimeter feature in the image and/or imaging sensor data. For example, a model may be trained using a machine-learning technique to identify and/or recognize at least some representations of building-perimeter features within images and/or imaging sensor data and to identify respective geometric planes defined thereby within the images and/or imaging sensor data. In an example embodiment, the same machine-learning trained model is used to determine whether a building-perimeter feature is present in the image and/or imaging sensor data and to identify the geometric plane defined by the building-perimeter feature within the image and/or imaging sensor data.

FIG. 5 illustrates an example image 500. The image 500 comprises a floor portion 510 and a wall portion 520. A building-perimeter feature (e.g., a window) 530 is disposed within the wall portion 520. The building-perimeter feature 530 has horizontal edges 532A, 532B and vertical edges 534A, 534B. The horizontal edges 532A, 532B and the vertical edges 534A, 534B define a geometric plane 538 that is characterized by feature direction 536.

Continuing with FIG. 4, at block 404, a location and/or orientation of the mobile device 20 with respect to the geometric plane is determined. For example, the network device 10 and/or mobile device 20 determines a location and/or an orientation of the mobile device 20 with respect to the geometric plane when the image and/or imaging sensor data was captured. For example, the network device 10 and/or mobile device 20 comprises means, such as processor 12, 22, memory 14, 24, and/or the like, for determining a location and/or an orientation of the mobile device 20 with respect to the geometric plane when the mobile device 20 captured the image and/or imaging sensor data. For example, the relative angle between the heading and/or forward direction of the mobile device 20 (and/or the axis of the imaging sensor 29 of the mobile device 20) and the feature direction is determined, in an example embodiment. For example, a distance estimate indicating an approximate distance between the mobile device 20 and the building-perimeter feature is determined, in an example embodiment.

In various embodiments, a variety of image processing and/or analyzing techniques may be used to determine the location and/or orientation of the mobile device 20 with respect to the geometric plane. For example, based on triangle geometry (e.g., Pythagorean theorem, angle-side-angle theorem, and/or the like), an approximate and/or assumed height of the imaging sensor 29 above the floor at the time the image and/or imaging sensor data was captured, measurements of one or more angles and/or height-to-length ratios within the image and/or imaging sensor data, and/or the like, an approximate distance between the mobile device 20 and the building-perimeter feature may be estimated. In an example embodiment, a machine-learning trained model (possibly the same machine-learning trained model that identified the geometric plane and/or a machine-learning trained model in communication with the machine-learning trained model that identified the geometric plane (e.g., via an application program interface (API) and/or the like)) is configured to receive the image and/or imaging sensor data as input and determine and/or estimate an approximate distance between the mobile device 20 and the building-perimeter feature when the mobile device 20 captured the image and/or the imaging sensor data.

In an example embodiment, in instances where the approximate distance between the mobile device 20 and the building-perimeter feature does not satisfy one or more proximity criteria (e.g., is greater than a threshold distance), it may be determined (e.g., by the network device 10 and/or mobile device 20) that the mobile device 20 is not proximate the building-perimeter feature. For example, in a warehouse or other large, generally open indoor space, a window in the exterior wall of the building may be within a field of view of an imaging sensor 29 even when the mobile device 20 is located a significant distance (e.g., more than five meters, more than ten meters, and/or the like) from the exterior wall of the building comprising the window. In an example embodiment, when it is determined that the mobile device 20 is not proximate the building-perimeter feature, the process may stop and/or return to block 302 (e.g., the location information may not be determined and/or provided). In instances where the approximate distance between the mobile device 20 and the building-perimeter feature do satisfy one or more proximity criteria (e.g., the approximate distance is less than the threshold distance), the process continues such that the location information is determined and/or provided.

In an example embodiment, the perspective of the geometric plane in the image and/or imaging sensor data may be used to determine the orientation of the mobile device 20 with respect to the building-parameter feature when the mobile device 20 captured the image and/or imaging sensor data. For example, an angle θ between horizontal within the image and/or imaging sensor data (i.e. projection of the horizon line 540 on the image plane) and a line known to be horizontal in the real world (e.g., the horizontal edge 532B of the building-perimeter feature 530) may be measured and/or determined and used to determine the orientation of the mobile device 20 with respect to the building-parameter feature when the mobile device 20 captured the image and/or imaging sensor data. In an example embodiment, a machine-learning trained model (possibly the same machine-learning trained model that identified the geometric plane and/or a machine-learning trained model in communication with the machine-learning trained model that identified the geometric plane (e.g., via an application program interface (API) and/or the like)) is configured to receive the image and/or imaging sensor data as input and determine and/or estimate an orientation of the mobile device 20 with respect to the building-perimeter feature when the mobile device 20 captured the image and/or the imaging sensor data. In an example embodiment, the orientation of the mobile device 20 with respect to the building-perimeter feature is the angle θ between the feature direction 636 and the pointing 640 of the mobile device 20 when the image and/or imaging sensor data was captured, as shown in FIG. 6. In various embodiments, the feature direction 636, pointing 640, and a defined geographical direction 650 are defined in a three dimensional or two dimensional coordinate frame that corresponds to the body frame of the mobile device 20, a local coordinate from of the building, a global coordinate frame, and/or the like, in various embodiments.

Continuing with FIG. 4, at block 406, the orientation of the mobile device 20 with respect to a defined geographical direction is determined. In various embodiments, the defined geographical direction is a particular, defined compass heading. For example, the defined geographical direction may be North, South, East, West, Northeast, Northwest, Southeast, Southwest, fifteen degrees south of West, and/or the like. For example, the network device 10 and/or the mobile device 20 determines the orientation of the mobile device 20 with respect to a defined geographical direction. For example, the network device 10 and/or mobile device 20 comprises means, such as processer 12, 22, memory 14, 24, and/or the like, for determining the orientation of the mobile device 20 with respect to the defined geographical direction.

In various embodiments, the corresponding sensor data is used to determine the orientation of the mobile device 20 with respect to the defined geographical direction. For example, in various embodiments, the corresponding magnetic data and/or acceleration data (e.g., captured by magnetometers and/or accelerometers of the mobile device 20 at substantially the same time and/or location as the capturing of the image and/or imaging sensor data) may be processed and/or analyzed to determine the orientation of the mobile device 20 with respect to the defined geographical location when the mobile device 20 captured the image and/or imaging sensor data. In an example embodiment, the orientation of the mobile device 20 with respect to the defined geographical location comprises determining the direction of gravity based on the acceleration data, determining the defined geographical direction within the local coordinate frame of the mobile device 20 based at least in part on the magnetic data such that the defined geographical direction within the local coordinate frame of the mobile device 20 is perpendicular to the direction of gravity.

At block 408, the building that the mobile device 20 is located within is identified. For example, the network device 10 and/or mobile device 20 identifies the building within which the mobile device 20 is located. For example, the network device 10 and/or mobile device 20 comprises means, such as processors 12, 22, memory 14, 24, and/or the like, for identifying the building within which the mobile device 20 is located. In an example embodiment, a GNSS-based position estimate for the mobile device 20 that was captured within a particular time period with respect to the capturing of the image and/or imaging sensor data (e.g., within one minute, five minutes, ten minutes, within fifteen minutes, within half an hour, and/or the like) is used to identify a building within which the mobile device 20 is located. In an example embodiment, a GNSS-based position estimate that was captured and/or determined shortly before the mobile device 20 entered the building is used to identify a building that the mobile device 20 is located within. For example, the final GNSS-based location estimate before the mobile device 20 entered the building (e.g., as determined based on a change in the quality of the GNSS signal, and/or the like). In an example embodiment, the building within which the mobile device 20 is located is determined based on one or more radio nodes 40 observed by the mobile device 20. For example, one or more radio nodes or wireless signals emitted, transmitted, generated, and/or broadcasted by one or more radio nodes and observed by the mobile device within a particular time period with respect to the capturing of the image and/or imaging sensor data (e.g., within one minute, five minutes, ten minutes, within fifteen minutes, within half an hour, and/or the like) is used to identify a building within which the mobile device 20 is located, in an example embodiment. Various other techniques are used to identify the building within which the mobile device 20 is located in various embodiments.

At block 410, a building model for the building within which the mobile device 20 is located is obtained, accessed, retrieved, read, requested and received (e.g., via an API and/or the like), and/or the like. For example, the network device 10 and/or mobile device 20 obtains, access, retrieves, reads, requests and receives, and/or the like a building model for the building within which the mobile device 20 is located. For example, the network device 10 and/or the mobile device 20 comprises means, such as processor 12, 22, memory 14, 24, and/or the like, for obtaining, accessing, retrieving, reading, requesting and receiving, and/or the like a building model for the building within which the mobile device 20 is located.

In various embodiments, the building model is a 2D, 2.5D, or 3D model of the building. In various embodiments, the building model comprises a plurality of perimeter portions that each represent a part of the perimeter of the building. For example, the exterior walls of the building may each be represented by a perimeter portion. In an example embodiment, the building model comprises at least one indication of the location of at least a portion of the building. For example, the latitude and longitude of at least one point on the building perimeter (e.g., at least one point corresponding to an exterior wall, a corner of the building, the center of the building, a main door of the building, and/or the like) is indicated by the building model, in an example embodiment. In an example embodiment, the orientation of the perimeter portions with respect to the defined geographical direction is indicated by and/or deducible from information provided by the building model.

At block 412, a particular perimeter portion corresponding to the building-perimeter feature is identified. For example, network device 10 and/or mobile device 20 identifies and/or determines a particular perimeter portion corresponding to the building-perimeter feature. For example, the network device 10 and/or mobile device 20 comprises means, such as processor 12, 22, memory 14, 24, and/or the like, for identifying and/or determining a particular perimeter portion corresponding to the building-perimeter feature. For example, based on the orientation of the mobile device 20 with respect to the building-perimeter feature and/or the geometric plane defined in the image and/or imaging sensor data thereby and the orientation of the mobile device 20 with respect to the defined geographical direction, the orientation of the feature direction with respect to the defined geographical direction is determined. Based on the orientation of the feature direction with respect to the defined geographical direction, the particular perimeter portion corresponding to the building-perimeter feature is identified.

FIG. 6 illustrates an example, building model 600 comprising perimeter portions 610A, 610B, 610C, 610D. In an example, a mobile device 20 located at point 660 captures an image comprising a representation of the building-perimeter feature 630 having feature direction 636. The angle α indicates the orientation between the defined geographical direction 650 and the pointing 640 of the mobile device 20. Based on the angle β indicating the orientation between the pointing 640 and the feature direction 636 defined by the building-perimeter feature 630 and the angle α, the orientation of the feature direction 636 with respect to the defined geographical direction 650 is determined, in an example embodiment. Based on the orientation of the feature direction 636 with respect to the defined geographical direction 650, and the information regarding the building perimeter portions 610 provided by the building model 600, the particular perimeter portion 610A is identified as corresponding to the building-perimeter feature 630. For example, a perimeter direction 670 that is defined to be perpendicular to the particular perimeter portion 610A and perpendicular to a vertical direction is substantially parallel to the feature direction 636 once the feature direction 636 is transformed and/or rotated into the frame of reference of the building model (e.g., based on the orientation of the feature direction 636 with respect to the defined geographical direction 650).

Returning to FIG. 4, at block 414, location information for the mobile device 20 and corresponding to when the mobile device 20 captured the image and/or imaging sensor data is determined and/or provided. For example, the network device 10 and/or mobile device 20 determines location information for the mobile device and corresponding to when the mobile device 20 capture the image and/or imaging sensor data based at least in part on and/or corresponding to the particular perimeter portion. For example, the network device 10 and/or the mobile device 20 comprises means, such as processor 12, 22, memory 14, 24, communications interface 16, 26, user interface 18, 28, and/or the like, for determining and/or providing location information for the mobile device and corresponding to when the mobile device 20 capture the image and/or imaging sensor data based at least in part on and/or corresponding to the particular perimeter portion. The location information provides an indication of the location and/or position of the mobile device 20 when the mobile device 20 captured the image and/or imaging sensor data and the corresponding sensor data. For example, in an example embodiment, the location information comprises an indication of a portion of the perimeter of the building that the mobile device 20 was located near, adjacent, and/or in proximity to when the mobile device 20 captured the image and/or imaging sensor data and the corresponding sensor data. In an example embodiment, the location information comprises and/or is associated with a time stamp indicating a date and/or time when the image and/or imaging sensor data and/or the corresponding sensor data was captured by the mobile device 20. In an example embodiment, the location information comprises a respective latitude and longitude (and possibly altitude or elevation) of one or more points along the particular perimeter portion (e.g., end points of the particular perimeter portion, a center point of the particular perimeter portion, and/or the like) and/or the location of the mobile device when the image and/or imaging sensor data and/or the corresponding sensor data was captured by the mobile device 20.

The location information may then be used as input to a positioning algorithm used to estimate future and/or past positions of the mobile device 20, used to update a radio map (e.g., based on corresponding radio data), used to perform one or more positioning and/or navigation-related functions, and/or the like. For example, the location information may be provided as input to a program, application, or function (e.g., a radio map updating/generating program, application, or function; a positioning and/or navigation-related program, application, or function; a hybrid positioning algorithm program, application, or function; and/or the like) operating on and/or being executed by the network device 10 and/or mobile device 20. For example, the location information may be provided (e.g., transmitted) by the mobile device 20 such that the network device 10 receives the location information, or vice versa. For example, the location information may be displayed via a display of a user interface 18, 28.

IV. Technical Advantages

Efficient and accurate determining of the position of a mobile device in an indoor environment is an existing technical problem. As such, problems regarding determining the location of a mobile device in an indoor environment exist. For example, accurate GNSS-based positioning in generally not available in indoor environments. Indoor radio-based positioning techniques require accurate learning of the location of (generally indoor) radio nodes and, thus, the efficient generation and updating/managing of accurate radio maps is a technical problem. Hybrid and/or motion-based positioning techniques require frequent fixing to a reference location, leading to problems regarding how to provide additional information regarding the relationship between a mobile device's location with respect to a reference location such that an accurate position estimate for the mobile device can be determined. Therefore, various technical problems exist in the field of indoor positioning that are addressed by various embodiments described herein.

Various embodiments provide technical solutions to these technical problems. In particular, various embodiments enable the determination of location information that may include and/or indicate when a mobile device is located proximate a perimeter of a building or other indoor environment, which perimeter of the building or other indoor environment that the mobile device is proximate, an orientation of the mobile device with respect to the perimeter of the building, a location of the mobile device with respect to a building-perimeter feature located in/on the perimeter of the building, and/or the like. This location information can be used as input to a position estimate algorithm (e.g., a hybrid positioning algorithm), used to determine a location of a radio node (e.g., for use in generating and/or updating a radio map), used to perform a positioning and/or navigation-related function, and/or the like. Thus, various embodiments provide improvements to the field of indoor location determination and/or indoor positioning.

V. Example Apparatus

The network device 10 and/or mobile device 20 of an example embodiment may be embodied by or associated with a variety of computing entities including, for example, a navigation system including a global navigation satellite system (GNSS), a cellular telephone, a mobile or smart phone, a personal digital assistant (PDA), a watch, a camera, a computer, an Internet of things (IoT) item, and/or other device that can capture images and/or imaging sensor data. Additionally or alternatively, the network device 10 and/or mobile device 20 may be embodied in other types of computing devices, such as a server, a personal computer, a computer workstation, a laptop computer, a plurality of networked computing devices or the like, that are configured to capture and/or process/analyze images and/or imaging sensor data to determine location information based at least in part thereon, and/or the like. In an example embodiment, a mobile device 20 is a smartphone, tablet, laptop, PDA, and/or other mobile computing device and a network device 10 is a server that may be part of a Cloud-based computing asset and/or processing system.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network device 10 and/or mobile device 20 may be embodied by a computing entity and/or device. However, in some embodiments, the network device 10 and/or mobile device 20 may be embodied as a chip or chip set. In other words, the network device 10 and/or mobile device 20 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor 12, 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22 may include one or more processing cores configured to perform independently. A multi-core processor may enable multiprocessing within a single physical package. Additionally or alternatively, the processor 12, 22 may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network device 10 and/or mobile device 20 may include a user interface 18, 28 that may, in turn, be in communication with the processor 12, 22 to provide a graphical user interface (GUI) and/or output to the user, such as one or more selectable user interface elements that comprise at least a portion of a description of a respective known landmark, at least a portion of a radio map, a result of a positioning and/or navigation-related function, navigable routes to a destination location and/or from an origin location, and/or the like, and, in some embodiments, to receive an indication of a user input. As such, the user interface 18, 28 may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22 (e.g., memory device 14, 24 and/or the like).

The network device 10 and/or mobile device 20 may optionally include a communication interface 16, 26. The communication interface 16, 26 may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In various embodiments, a network device 10 and/or mobile device 20 may comprise a component (e.g., memory 14, 24, and/or another component) that stores a digital map (e.g., in the form of a geographic database) comprising a first plurality of data records, each of the first plurality of data records representing a corresponding traversable map element (TME). At least some of said first plurality of data records map information/data indicate current traffic conditions along the corresponding TME. For example, the geographic database may include a variety of data (e.g., map information/data) utilized in various navigation functions such as constructing a route or navigation path, determining the time to traverse the route or navigation path, matching a geolocation (e.g., a GNSS determined location, a radio-based position estimate) to a point on a map, a lane of a lane network, and/or link, one or more localization features and a corresponding location of each localization feature, and/or the like. For example, the geographic database may comprise a radio map, such as a radio positioning map, comprising an access point registry and/or instances of access point information corresponding to various access points.

For example, a geographic database may include road segment, segment, link, lane segment, or TME data records, point of interest (POI) data records, localization feature data records, radio node data records, building model data records, and/or other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, radio node record, building model, or recorded route information can be matched with respective map or geographic records via position or GNSS data associations (such as using known or future map matching or geo-coding techniques), for example. In an example embodiment, the data records may comprise nodes, connection information/data, intersection data records, link data records, POI data records, radio node data records, building model data records, and/or other data records. In an example embodiment, the network device 10 may be configured to modify, update, and/or the like one or more data records of the geographic database. For example, the network device 10 may modify, update, generate, and/or the like map information/data corresponding to a radio map and/or TMEs, links, lanes, road segments, travel lanes of road segments, nodes, intersection, pedestrian walkways, buildings, perimeter portions of buildings, elevators, staircases, and/or the like and/or the corresponding data records, a localization layer (e.g., comprising localization features), a registry of access points to identify mobile access points, and/or the corresponding data records, and/or the like.

In an example embodiment, the TME data records are links, lanes, or segments (e.g., maneuvers of a maneuver graph, representing roads, travel lanes of roads, streets, paths, navigable aerial route segments, and/or the like as can be used in the calculated route or recorded route information for determination of one or more personalized routes). The intersection data records are ending points corresponding to the respective links, lanes, or segments of the TME data records. The TME data records and the intersection data records represent a road network and/or other traversable network, such as used by vehicles, cars, bicycles, golf carts and/or electric wheelchair users, pedestrians, and/or other entities. Alternatively, the geographic database can contain path segment and intersection data records or nodes and connection information/data or other data that represent pedestrian paths or areas in addition to or instead of the vehicle road record data, for example. Alternatively and/or additionally, the geographic database can contain navigable aerial route segments or nodes and connection information/data or other data that represent an navigable aerial network, for example.

The TMEs, lane/road/link/path segments, segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

VI. Apparatus, Methods, and Computer Program Products

As described above, FIGS. 3 and 4 illustrate flowcharts of a network device 10 and/or mobile device 20, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    identifying, by one or more processors and within an image captured by an imaging device of a mobile device, a geometric plane defined by a building-perimeter feature represented by the image, the building-perimeter feature being part of or connected to an exterior wall of a building within which the mobile device is located;
    determining, by the one or more processors, one or more of an orientation or a location of the mobile device with respect to the identified geometric plane defined by the building-perimeter feature;
    based at least in part on sensor data captured by one or more sensors of the mobile device, determining, by the one or more processors, an orientation of the mobile device with respect to a defined geographical direction;
    obtaining or accessing, by the one or more processors, a building model for a building within which the mobile device is located, wherein the building model defines one or more perimeter portions of the building, each respective perimeter portion of the one or more perimeter portions corresponding to one or more respective exterior walls of the building;
    based at least in part on (i) one or more of the orientation or the location of the mobile device with respect to the identified geometric plane defined by the building-perimeter feature and (ii) the orientation of the mobile device with respect to the defined geographical direction, identifying, by the one or more processors, a particular perimeter portion of the one or more perimeter portions that corresponds to the building-perimeter feature represented by the image; and
    determining or providing, by the one or more processors, location information that corresponds to or is based on the particular perimeter portion that was identified, the location information representing where the mobile device is or was located substantially when the image was captured.

2. The method of claim 1, wherein the building-perimeter feature is a window.

3. The method of claim 1, wherein the geometric plane defined by the building-perimeter feature is determined based at least in part on at least one of (a) a horizontal edge of the building-perimeter feature within the image or (b) a vertical edge of the building-perimeter feature within the image.

4. The method of claim 1, wherein the geometric plane defines a feature direction that is normal to the geometric plane and identifying the particular perimeter portion of the one or more perimeter portions that corresponds to the building-perimeter feature comprises comparing the feature direction and a perimeter direction of the particular perimeter portion.

5. The method of claim 1, wherein the geometric plane is identified in the image by a feature detector operating on the mobile device.

6. The method of claim 5, wherein the feature detector is a machine-learning trained classifier.

7. The method of claim 1, wherein the sensor data comprises at least one of (a) magnetic data or (b) acceleration data and the one or more sensors of the mobile device comprise at least one of (a) a magnetic sensor or (b) an accelerometer.

8. The method of claim 1, further comprising, prior to determining the location information, obtaining an indication that a location of the mobile device with respect to the exterior wall feature satisfies one or more proximity criteria, wherein the indication is generated based at least in part on processing of the image.

9. The method of claim 8, wherein a determination that the location of the mobile device with respect to the exterior wall feature satisfies the one or more proximity criteria is performed by a machine-learning trained artificial neural network trained to detect the building-perimeter feature in the image.

10. The method of claim 1, wherein the building within which the mobile device is located is determined based at least in part on at least one of (a) an identifier of a wireless signal observed by the mobile device within a particular time period with respect to the capturing of the image, (b) a global navigation satellite system (GNSS) position estimate determined within a particular time period with respect to the capturing of the image, or (c) a final GNSS position estimate determined prior to the mobile device entering the building.

11. The method of claim 1, further comprising:
obtaining radio observation data captured by the mobile device at substantially a same time as the image was captured; and
at least one of (a) providing the radio observation data or (b) using the radio observation data in association with the location information to update a radio map.

12. The method of claim 1, further comprising using the determination that the mobile device was located within the building proximate the particular perimeter portion corresponding to the building-perimeter feature when the image was captured as input to a hybrid positioning algorithm.

13. The method of claim 1, further comprising causing a user interface of the mobile device to display a position estimate of the mobile device based at least in part on the location information.

14. An apparatus comprising at least one processor and at least one memory storing computer program instructions, the at least one memory and the computer program code are configured to, with the at least one processor, cause the apparatus to at least:
identify, within an image captured by an imaging device of a mobile device, a geometric plane defined by a building-perimeter feature represented by the image, the building-perimeter feature being part of or connected to an exterior wall of a building within which the mobile device is located;
determine one or more of an orientation or a location of the mobile device with respect to the identified geometric plane defined by the building-perimeter feature;
based at least in part on sensor data captured by one or more sensors of the mobile device, determine an orientation of the mobile device with respect to a defined geographical direction;
obtain or access a building model for a building within which the mobile device is located, wherein the building model defines one or more perimeter portions of the building, each respective perimeter portion of the one or more perimeter portions corresponding to one or more respective exterior walls of the building;
based at least in part on (i) one or more of the orientation or the location of the mobile device with respect to the identified geometric plane defined by the building-perimeter feature and (ii) the orientation of the mobile device with respect to the defined geographical direction, identify a particular perimeter portion of the one or more perimeter portions that corresponds to the building-perimeter feature represented by the image; and
determine or provide location information that corresponds to or is based on the particular perimeter portion that was identified, the location information representing where the mobile device is or was located substantially when the image was captured.

15. The apparatus of claim 14, wherein the geometric plane defined by the building-perimeter feature is determined based at least in part on at least one of (a) a horizontal edge of the building-perimeter feature within the image or (b) a vertical edge of the building-perimeter feature within the image.

16. The apparatus of claim 14, wherein the geometric plane defines a feature direction that is normal to the geometric plane and identifying the particular perimeter portion of the one or more perimeter portions that corresponds to the building-perimeter feature comprises comparing the feature direction and a perimeter direction of the particular perimeter portion.

17. The apparatus of claim 14, wherein the sensor data comprises at least one of (a) magnetic data or (b) acceleration data and the one or more sensors of the mobile device comprise at least one of (a) a magnetic sensor or (b) an accelerometer.

18. The apparatus of claim 14, wherein the building within which the mobile device is located is determined based at least in part on at least one of (a) an identifier of a wireless signal observed by the mobile device within a particular time period with respect to the capturing of the image, (b) a global navigation satellite system (GNSS) position estimate determined within a particular time period with respect to the capturing of the image, or (c) a final GNSS position estimate determined prior to the mobile device entering the building.

19. The apparatus of claim 14, wherein the at least one memory and the computer program code are further configured to, with the at least one processor, cause the apparatus to perform at least one of:
obtaining radio observation data captured by the mobile device at substantially a same time as the image was captured; and at least one of (a) providing the radio observation data or (b) using the radio observation data in association with the location information to update a radio map;
using the determination that the mobile device was located within the building proximate the particular perimeter portion corresponding to the building-perimeter feature when the image was captured as input to a hybrid positioning algorithm; or
causing a user interface of the mobile device to display a position estimate of the mobile device based at least in part on the location information.

20. A computer program product comprising at least one non-transitory computer-readable storage medium having computer-readable program instructions portions stored therein, the computer-readable program instruction portions comprise executable portions configured, when executed by a processor of an apparatus, to cause the apparatus to:
identify, within an image captured by an imaging device of a mobile device, a geometric plane defined by a building-perimeter feature represented by the image, the building-perimeter feature being part of or connected to an exterior wall of a building within which the mobile device is located;
determine one or more of an orientation or a location of the mobile device with respect to the identified geometric plane defined by the building-perimeter feature;
based at least in part on sensor data captured by one or more sensors of the mobile device, determine an orientation of the mobile device with respect to a defined geographical direction;
obtain or access a building model for a building within which the mobile device is located, wherein the building model defines one or more perimeter portions of the building, each respective perimeter portion of the one or more perimeter portions corresponding to one or more respective exterior walls of the building;
based at least in part on (i) one or more of the orientation or the location of the mobile device with respect to the identified geometric plane defined by the building-perimeter feature and (ii) the orientation of the mobile device with respect to the defined geographical direction, identify a particular perimeter portion of the one or more perimeter portions that corresponds to the building-perimeter feature represented by the image; and determine or provide location information that corresponds to or is based on the particular perimeter portion that was identified, the location information representing where the mobile device is or was located substantially when the image was captured.

* * * * *